UNITED STATES PATENT OFFICE 2,282,892

DEHYDRATING CASTOR OIL

Alexander Schwarcman, Buffalo, N. Y., assignor to Spencer Kellogg and Sons, Inc., Buffalo, N. Y., a corporation of New York No Drawing. Application May 15, 1941, Serial No. 393,691

5 Claims. (Cl. 260—407)

This invention or discovery relates to dehydrating castor oil; and it comprises a method of dehydrating castor oil which comprises intimately mixing castor oil with a minor amount of concentrated sulfuric acid, advantageously about 0.05 to 0.1 per cent by weight on the oil, the mixing being advantageously effected at low temperature, rapidly heating the oil up to a temperature above 450° F., and advantageously of the order of 540° F., and continuing heating at the temperature so attained until the iodine value of the oil increases to about 130, thus obtaining a light colored oil of low acid value, low acetyl value and good potential drying properties, this oil being advantageously subsequently polymerized to a viscosity of about Z–2 on the Gardner-Holdt scale, by heating to a temperature of about 560 to 590° F.; the heating in both stages being advantageously effected under vacuum, with a flow of carbon dioxide or other inert gas through the oil during the dehydrating stage and with a flow of steam through the oil during the polymerizing stage; and it comprises, as new products, the improved dehydrated oil and the polymerized oil obtained by the process described; all as more fully hereinafter set forth and as claimed.

It has long been known that castor oil is largely composed of the triglyceride of ricinoleic acid; that is, of ricinolein. Ricinoleic acid has one double bond in the carbon chain, and is further characterized by carrying an alcoholic hydroxyl group. Because of its alcoholic nature, castor oil is soluble in alcohol, but is not soluble in most hydrocarbon solvents, including petroleum oils. Normal castor oil is not a drying oil. It is a lubricating oil, but is not miscible with other lubricating oils, especially those of petroleum origin.

It has also been known for many years that upon heating castor oil to suitable temperatures under various pressure conditions, the oil undergoes various reactions, including the development of miscibility with mineral oils. In these reactions, dehydration frequently occurs with elimination of some or all of the alcoholic hydroxyl groups. If the heating is sufficiently prolonged at high temperatures, destructive distillation (pyrolysis) occurs, with substantial decomposition.

During the dehydration or dehydroxylation which ordinarily occurs in thermal treatments of castor oil at moderate temperatures, hydroxyl groups disappear from the ricinoleic acid chains, and water is evolved. The castor oil thus loses its alcoholic properties and becomes miscible with mineral oils. Under suitable conditions, an adjacent hydrogen atom is removed with each hydroxyl group, and an additional double bond is thus developed in each ricinoleic acid group. When enough of these additional double bonds are developed, the oil acquires useful drying properties.

In practice, actions occurring in heating castor oil are not wholly simple. Side reactions are apt to occur, including darkening, development of acidity and pyrolysis to a greater or less extent. It is difficult to obtain a light colored commercial oil in which the side reactions have not gone forward to a damaging extent.

The literature contains many suggestions of catalysts intended to accelerate dehydration so that castor oil can be substantially dehydrated before other types of decomposition become pronounced. Almost all conceivable types of compounds have been proposed for this purpose. These include numerous metals, various oxides, mixed oxides, various types of earths, organic and inorganic acids, esters, and many types of salts, including normal salts and acid salts, as well as oxidizing compounds and reducing compounds.

These various catalysts and reagents vary considerably in the results they produce, but in a general way none converts castor oil into a completely satisfactory light colored acid-free drying oil, when employed in the ways previously suggested. However, nearly all of these various catalysts accelerate dehydration of castor oil, at least to some extent. Many of them are useful only in producing a dehydrated oil which is miscible with mineral oils, and some are effective to catalyze substantially complete dehydration and give an oil having drying properties. However, the majority of the catalysts proposed both for making miscible oil and for making drying oil do not give an action much different from that obtained in heating castor oil alone. In general, the acid compounds are most effective, but they all have certain disadvantages. For example, with solid compounds and earthy mixtures a solid residue remains which must afterwards be separated from the thick oil; something which is not altogether easy. Organic acids act, in a general way, according to their degree of acidity, and rather large additions are usually required to give any improvement over the results obtained in heating the castor oil alone. Of the inorganic acids, some have substantially no effect, and practically all have a tendency to darken the oil.

Sulfuric acid immediately suggests itself for this purpose, because of its low cost and availability, and its well-known dehydrating effect on compounds containing alcoholic hydroxyl groups. Its use for dehydroxylating ordinary alcohol with formation of ethylene is well known. However, it also has an equally well-known charring and darkening effect on all organic materials, including vegetable oils. There are other actions, not here important, in which sulfuric acid sulfonates oil, as in making Turkey red oil.

It has been suggested that castor oil can be heated with catalytic amounts of sulfuric acid of the order of 0.3 per cent, on the weight of the oil, to temperatures not exceeding 160° C. (320° F.) without discoloration of the oil. However, trial has shown that when heating castor oil with 0.3 per cent or similar quantities of concentrated sulfuric acid to temperatures in the neighborhood of 320° F., the oil rapidly becomes too dark in color for commercial use, and becomes the more discolored the longer it is heated at this temperature, and it does not acquire useful drying properties. It has naturally been supposed that heating to temperatures higher than 320° F. in the presence of sulfuric acid would increase the discoloration of castor oil, since it is known that higher temperatures alone generally cause discoloration. This supposition is apparently correct for temperatures up to somewhere above 400° F., and apparently up to about 450° F.

I have now found, however, that if castor oil is mixed with minor amounts of sulfuric acid in the cold (e. g., at room temperature) and rapidly heated through intermediate temperatures to temperatures above 500° F., and preferably of the order of 540° F., then held at this temperature, thorough dehydration is rapidly obtained and a substantially water-white oil is produced. Contrary to all expectations, the discoloration, which becomes so evident when castor oil is held at temperatures of the order of 300 to 450° F. with a minor amount of sulfuric acid, does not appear when the slightly acidified oil is rapidly heated to temperatures above 500° F. such as 540° F., and maintained at these temperatures for a substantial period.

This new and important result is achieved even when using amounts of acid giving severe discoloration and blackening at lower temperatures, such as 320° F.; that is, amounts on the order of 0.3 per cent by weight on the oil. However, when rapidly heating the oil and acid to temperatures above 500° F., in accordance with the present invention, smaller amounts of sulfuric acid are fully effective, and have the advantage that they cause less contamination of the oil and yield a brighter product. Concentrated sulfuric acid in amounts of the order of 0.15 per cent may be used in accordance with this invention, but I find it most advantageous to use even smaller amounts, such as 0.05 per cent to 0.1 per cent, and preferably about 0.08 or 0.09 per cent, by weight on the oil treated.

Even with these minute amounts of acid, I have found it possible to obtain a modified castor oil product having an iodine number on the order of 130, and often 132 to 135 or higher, in commercial operation. As noted, this oil is substantially water-white in color when using a good grade of castor oil as a starting material. It also has a low acid number. The high iodine number of this oil indicates that dehydroxylation has been quite complete and this is further demonstrated by the low acetyl value, which is frequently about 4. The treated oil polymerizes quite rapidly by heating to the usual bodying temperatures of 550 to 600° F.; advantageously about 570° F. After polymerization, it dries very rapidly (especially in the presence of the usual siccatives) to form an excellent film more waterproof than the films obtainable with other drying oils, including linseed oil.

As noted, an important feature of this invention is a rapid heating of the oil to a temperature of at least about 500° F. It has been definitely established that in order to obtain a product of the desired light color, dehydration must be largely effected at temperatures above 450° F. and preferably with most of the reaction occurring above 500° F. Optimum results are obtained at temperatures of about 540 to 550° F., with a minimum of heating time at lower temperatures. In particular, the heating should be rapid from a temperature near 300° F. to a temperature somewhat above 450° F. Discoloration and blackening of the oil take place with great rapidity at temperatures in this range in the presence of even the minute amounts of sulfuric acid used in accordance with this invention. In fact, there is usually some darkening in this temperature range even when heating castor oil, with or without the catalyst, as rapidly as possible to temperatures above 500° F. Under these circumstances, however, I have found that the darkening disappears upon further heating at higher temperatures, especially in the range around 540° F. But if the oil and acid catalyst are held for any substantial period at temperatures in the range from 300° to 450° F., and especially from 320 to 400° F., the oil becomes so discolored that it cannot subsequently be lightened sufficiently to make it useful in most drying oil applications, even by prolonged heating at the bleaching or non-coloring temperatures above 500° F.

However, as noted, if the oil is heated rapidly through the dangerous range below 450° F., and up to a substantially higher temperature, above 500° F., this discoloration does not occur, and a substantially water-white product is readily obtained. This discovery is one of the novel features of my invention. The absolute rate of heating which is required to produce the desired results is a function of the quantity of oil treated and the design of the treating apparatus. Thus, in some equipment heating through the danger range (from 300° F. to 450° F.) may consume two hours or more without detriment to the product, while in other equipment a period of one-half hour or less causes discoloration. In general, for any given treating apparatus, the best results are obtained when the oil and catalyst remain for the shortest possible time at temperatures in this discoloring range. Furthermore, from a study of numerous types of treating equipment, I have ascertained that optimum results (especially from the standpoint of color) are only obtainable when the minimum net heat input, while the oil is at temperatures in this range, is about 60 to 100 B. t. u. per pound of oil per hour. By "net heat input," as used herein, I mean the input which raises the temperature of the oil, disregarding losses and other factors. With somewhat lower heat input rates, a useful product is sometimes obtainable, but not with the desired light color. I have also found that if the net heat input is zero, or very low, for any substantial period (such as 15 minutes or more) while the oil is at a temperature in the dangerous range, the color of the oil is seriously affected. This is avoided in accordance with my invention, by heating rapidly to temperatures above 500° F., and without substantial pause or "holding" at temperatures between 300° and 450° F. As noted, holding (with zero net heat input) in the range between 325° F. and 400° F. for more than a few minutes should be avoided if a light colored product is desired.

For these reasons, in dehydrating castor oil on a commercial scale in accordance with this invention, the heating is made rapid throughout all parts of the body of oil. I have found that this is readily accomplished in a kettle heated by a number of heater electrodes immersed in the oil. With the oil thoroughly agitated in such a kettle, as by means of a slight flow of carbon dioxide or other inert gas, the temperature of the oil can be raised rapidly and uniformly past the critical point where discoloration takes place. Rapid heating can also be effected by charging the oil and catalyst into a heated kettle through a coil heated to the desired temperature. Various other types of apparatus adapted to heat a large body of oil (such as 10 to 20 barrels) rapidly to the desired temperature, may also be employed.

In commercial operations of the process of this invention, it is advantageous to maintain the oil under vacuum throughout the heating. As is well known, all vegetable oils tend to decompose at elevated temperatures; and when air or oxygen is present, they form dark-colored products. This is largely avoided, or the products of decomposition are removed as they are formed, if the heating is effected under a substantial vacuum. As is also well known, it is advantageous to pass through the heated oil a current of inert gas to assist in eliminating oxygen from the apparatus and in removing undesired volatile products.

In a practical embodiment of this invention, 10,000 pounds of C. P. castor oil were charged at atmospheric temperature into a kettle having a corrosion-resistant lining. This kettle was provided with connections for introducing steam and carbon dioxide into the oil near the bottom of the kettle, and was equipped with a number of electric heaters which were immersed in the oil. The kettle also had a tight fitting cover, and was connected with an efficient vacuum pump and a condenser. The cover was closed tightly, a slight flow of $CO_2$ was passed through the oil to agitate the same, 8 pounds of concentrated sulfuric acid (0.08 per cent by weight on the oil) were added, and the heaters were turned on. The vacuum pump was started, and a vacuum of 26 to 29 inches was maintained while the temperature was raised steadily and rapidly to 540° F. This required between 2 and 3 hours with this quantity of oil. By the time the temperature of 540° was reached, dehydration was taking place rapidly, as shown by the flow from a condenser in the line beyond the vacuum pump. The temperature was kept at 540° F. for about 1 hour, at which time dehydration was substantially complete. A sample was removed, and found to have an iodine value of 132. In other runs, iodine values from 128 to 138 were found. The oil was nearly water-white and had a very low acetyl value, which was regularly about 4. The acid value of the oil produced in this run was 3, and in other similar runs, from 2 to 5.

After dehydration in the manner described, the temperature of the main body of oil was raised to 570°–580° F., and after a short time at this temperature it acquired a viscosity of Z–2 on the Gardner-Holdt scale. During polymerization, the flow of $CO_2$ was discontinued, and a minor flow of steam was substituted. The bodied oil, after addition of a trace of siccative, showed excellent drying properties and formed an exceptionally water-proof film after drying.

For the reasons previously stated and well-known in the art, it is advantageous during dehydrating and bodying to operate under vacuum, or with a flow of steam or other inert gas through the oil. However, substantially identical results are obtained when operating in the open at atmospheric pressure, except that the acid number is sometimes slightly higher, and the color may be somewhat darker.

My invention thus makes is possible to employ minute amounts of an inexpensive and easily available material, sulfuric acid, as the catalyst, in the dehydration of castor oil. In the process of this invention, no filtration or other troublesome step to remove the catalyst is required, and a product having exceptionally light color and excellent drying properties, and water-proofness in dried films, is obtained. An important feature of the process by which this improved drying oil is obtained is, as stated, the rapid heating of castor oil in the presence of a minute amount (advantageously less than 0.1 per cent) of concentrated sulfuric acid to a temperature of the order of 500° F. or above. The heating should be rapid and without pause through the temperature range from about 300 to about 450° F., where discoloration is particularly apt to occur. After the oil reaches a temperature above 500° F., such as 540° F., it should be maintained at that temperature until the iodine value increases to about 130. If it is merely desired to make an oil miscible with petroleum oils, but which does not have drying properties, heating is discontinued before the iodine value increases so much. Miscible oils of light color are obtained when, or shortly after, the temperature of 540° F. is reached in accordance with the process of this invention.

When drying oils are desired, the final polymerization step at temperatures above 550° F., and advantageously about 570° F., is of considerable importance, since dehydrated castor oil does not acquire the desired drying properties until after such bodying treatment. This treatment also improves the water-proof character of the films obtained by drying. The terms "useful drying properties," "desired drying properties," etc., as used herein, require that the oil, after bodying and subsequent thinning with a volatile solvent such as "Varnoline," and after addition of a trace of cobalt drier (e. g., 0.03 per cent by weight) must dry on glass to a hard non-tacky film in 16 hours or less. Drying in longer periods does not meet this definition.

While I do not wish to limit myself to any theory, it is my opinion that the excellent results obtained in this invention are due to the fact that the intimately admixed sulfuric acid is exposed to a temperature above 500° F. at which it rapidly gives vapors of "nascent" $SO_3$, and these vapors dissolve in the oil to effect the actions desired. The nascent $SO_3$ is taken up by the oil from the finely distributed liquid $H_2SO_4$ in a way not possible when directly applying gaseous $SO_3$.

While my invention has been described with reference to certain features and embodiments thereof which are now considered most advantageous, it should be understood that my invention is not limited thereto, but may be variously embodied and practiced within the scope of the appended claims.

What I claim is:

1. The process of dehydrating castor oil, which comprises mixing castor oil with about 0.05 to 0.1 per cent by weight of concentrated sulfuric acid, and rapidly heating the acidified oil to a temperature above 500° F.

2. The process of claim 1, wherein heating is continued at a temperature above 500° F. until the oil acquires an iodine value of the order of 130.

3. The method of manufacturing a drying oil from castor oil, which comprises mixing castor oil with about 0.05 to 0.1 per cent by weight of concentrated sulfuric acid, rapidly heating the mixture to a temperature above 500° F., continuing heating at a temperature of the order of 540° F. until the oil is substantially dehydrated and acquires an iodine value of the order of 130, and bodying the oil by heating at increased temperature until it acquires the desired viscosity.

4. The method of claim 3, wherein the dehydrating and bodying stages are carried out under vacuum, with a minor flow through the oil of carbon dioxide during the dehydrating stage, and of steam during the bodying stage.

5. The method of claim 3, wherein said rapid heating to a temperature above 500° F. comprises heating through the temperature range from 325° F. to 400° F. without substantial intervals when the net heat input is less than 60 B. t. u. per hour per pound of oil.

ALEXANDER SCHWARCMAN.